Nov. 19, 1929.  J. O. NEIKIRK ET AL  1,736,048
BRAKE RELEASE MECHANISM FOR RAILWAY CARS
Filed April 20, 1928
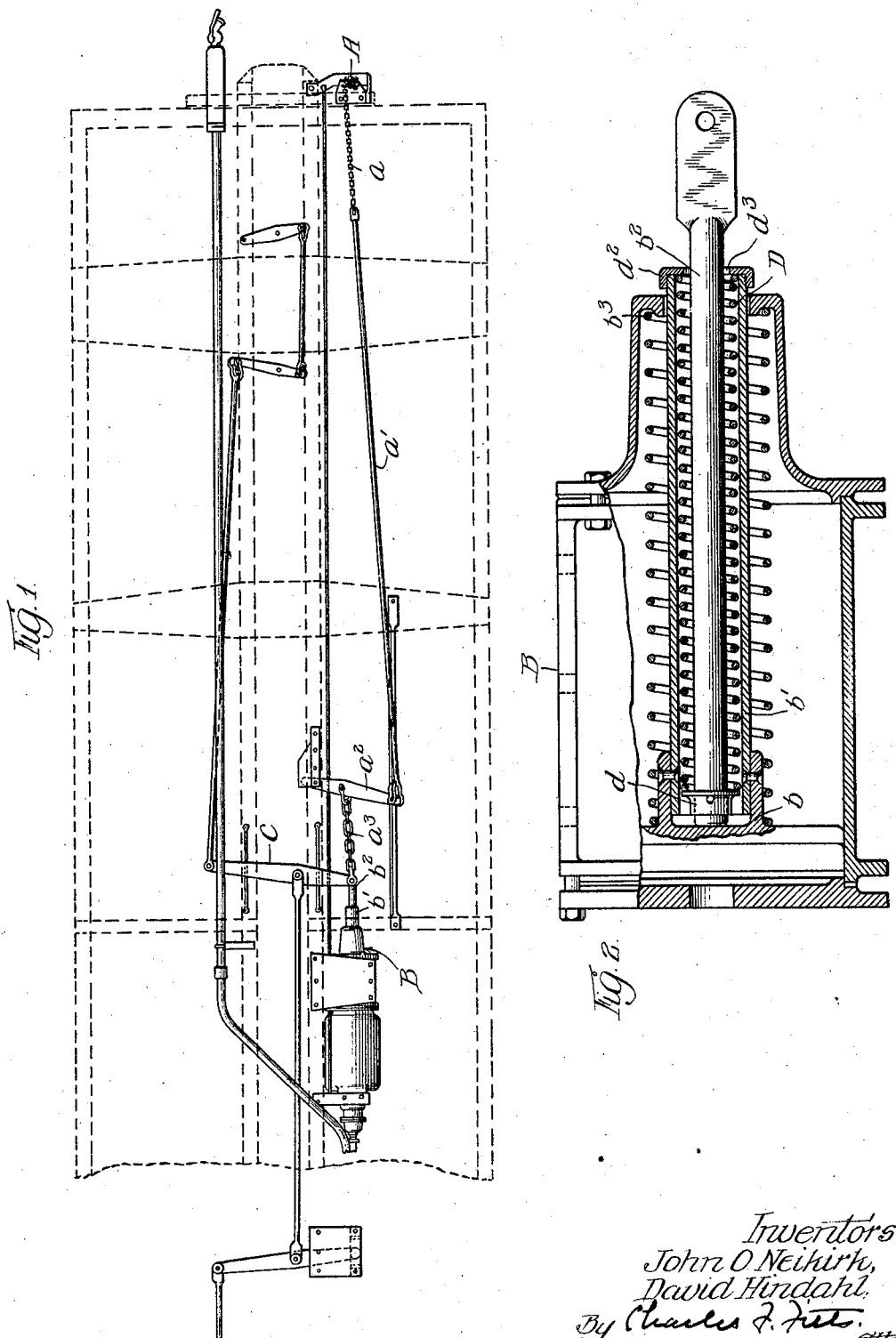
Inventors:
John O Neikirk,
David Hindahl.
By Charles J. Fits
attg.

Patented Nov. 19, 1929

1,736,048

UNITED STATES PATENT OFFICE

JOHN O. NEIKIRK AND DAVID HINDAHL, OF CHICAGO, ILLINOIS

BRAKE-RELEASE MECHANISM FOR RAILWAY CARS

Application filed April 20, 1928. Serial No. 271,470.

As is well known, brakes are applied to the wheels of railway cars through a fluid pressure mechanism commonly known as air brake mechanism, this mechanism acting throughout the train to apply the brakes practically simultaneously. The brakes of each car are also connected to hand brake mechanism comprising a brake staff connected through suitable means to the brakes so that the brakes on each car may be operated independently by hand. It is now required by the rules of the American Railway Association that the hand brake mechanism shall be substantially equal in power to the air brake mechanism. It is, therefore, necessary that suitable power multiplying devices shall be used between the brake staff and the wheels. These power multiplying devices take several forms, such as power multiplying gears or levers, or other means, all of which are well known in the art. As the hand brake mechanism and the air brake mechanism necessarily operate the same brakes they must be so connected that the air brake may operate without affecting the hand brake and that the hand brake shall operate without affecting the air brake, this mode of connection being also well known in the art and commonly practiced.

It has been found that the introduction of power multiplying devices in the hand brake system, whether by means of gears, levers or other devices, causes difficulty in the release of the brakes so that when the brake staff is unlocked to permit this release the brake shoes do not readily fall away from the wheels. To overcome this difficulty it has been proposed to introduce into the brake mechanism means to cause a complete release of the brake shoes from the wheels. Our invention relates to this release means and has for its object to provide such a means which shall be simple, economical of application and positive in its action.

Referring to the accompanying drawings,—Fig. 1 is a plan view showing the brake system of a railway car sufficient for an understanding of our invention. Fig. 2 is a cross section of the air brake cylinder having our invention applied thereto.

In the drawings, A is the brake staff of the hand brake mechanism connected in a usual manner through the flexible connection $a$, connecting rod $a'$, multiplying lever $a^2$ and suitable connection $a^3$ to the cylinder lever C of the brake system, all these connections being well known in the art.

B is the air brake cylinder receiving the piston $b$, to which is connected the elongated piston sleeve $b'$, the push rod $b^2$ sliding loosely within the elongated sleeve, the spring $b^3$, which serves to return the piston upon release of the air, the push rod $b^2$ being connected to the cylinder lever C, all these parts being well known in the art.

Owing to the fact that the rod $b^2$ slides loosely in the elongated sleeve $b'$, it is evident that on operation of the hand brake staff A the rod $b^2$, owing to its connection with the lever C, will move out through the sleeve $b'$ without in any way affecting the air brake system. It is also evident that owing to the connection $a$ and $a^3$ the air brake system may be operated without affecting the brake staff mechanism.

As before noted, it has been found in practice that the introduction of power multiplying devices in the hand brake system such as for example the multiplying lever $a^2$ shown in the present embodiment of our invention, causes the brake mechanism to stick and prevent the quick release of the brake shoes from the wheels. Furthermore, when the hand brake mechanism is operated, the rod $b^2$ of the air brake mechanism is pulled out from the elongated sleeve and ordinarily will remain in this outer position until it is gradually forced back by the falling of the brake shoes away from the wheels under the force of gravity.

In carrying out our invention, we provide a means for positively forcing this rod back to normal position when the brake is released, thus positively forcing the brake shoes away from the wheels and restoring the entire brake system to the normal inoperative position.

We accomplish this by surrounding the rod $b^2$ with a spring D bearing at its inner end against a spring seat $d$, which is rigidly connected to the inner end of the rod $b^2$ in any suitable manner. At its opposite end the spring D bears against a spring cap $d^2$ connected to the outer end of the elongated piston sleeve $b'$ in any suitable manner, such as for example the screw threads shown, this cap being provided with a central opening $d^3$ through which the rod $b^2$ passes freely. It is apparent from this description that we have provided the air cylinder with release mechanism, which is connected to the moving parts only of the air cylinder mechanism.

As a result of this construction, when the hand brake mechanism is operated, the rod $b^2$ is pulled, thus compressing or placing under strain the spring D. Upon release of the hand brake, the spring acts to return the rod to its normal position, thus moving the lever C and all connected parts to normal inoperative position.

In like manner, when the air brake mechanism is operated, air enters the brake cylinder B, thus forcing the piston $b$, together with the elongated sleeve $b'$ and the rod $b^2$, outward to set the brakes. Upon release of the air the piston $b$ is returned to its normal position by the spring $b^3$ as heretofore while the rod $b^2$ is returned as above described because it is held in the sleeve by means of the spring D and returned as a unit with the sleeve instead of, as heretofore, being left in its outer position.

As a result of the construction described, it is apparent that when the hand brake mechanism is operated the push rod $b^2$ is pulled forward, thus compressing or placing under strain the spring D, which, of course, offers resistance to the hand brake mechanism. The force of this spring both in compression and recoil is applied directly in the line of travel of the push rod and at the point in the system where a spring of minimum resistance is sufficient. It is apparent further that owing to the unitary movement of the push rod the sleeve and the spring when the air brake mechanism is operated, the spring causes no resistance to the operation of the air brake mechanism.

It will be seen that by our improved construction we have provided a means which, while permitting the independent operation of the hand brake and the air brake systems as heretofore, returns the parts to normal position when either system is operated and positively forces the brake shoes away from the wheels; that we have applied this means in such a way that the force is applied in the line of travel of the push rod so that there is no tendency of the parts to bind. We have also applied our return mechanism at a point where a spring of minimum resistance is sufficient to release the hand brakes and offers no resistance to the application of the air brakes. We have also provided a device which not only returns the mechanism to normal position when the hand brake is used but retains the push rod in normal position within the elongated sleeve at all times when the air brake system is used.

While we have herein described one embodiment of our invention, it will be understood that we intend to cover such changes and modifications thereto as come within the scope of the appended claims.

We claim:

1. In a railway car, air brake mechanism comprising the usual brake cylinder, piston and sleeve, a push rod loosely mounted in the sleeve and means within the cylinder applied to the push rod for returning the push rod to normal position within the sleeve after the push rod is drawn downwardly therefrom.

2. In a railway car having the usual air brake and hand brake mechanism, means connected to moving parts only of the air brake cylinder mechanism for restoring the brake mechanism to inoperative position.

3. In a railway car having the usual air brake and hand brake mechanism, means interposed between the push rod and the piston sleeve of the air cylinder for retaining the push rod in its innermost position within the sleeve throughout the operation of the air brake mechanism.

4. A braking system for railway cars comprising a hand power braking mechanism and an air power braking mechanism and means within the air brake cylinder resistant to the hand power mechanism only and acting in conjunction with the usual air brake for returning the brake system to normal inoperative position upon operation of either hand power mechanism or the air power mechanism.

5. A braking system for railway cars comprising a hand power braking mechanism and an air power braking mechanism, and means connected to the moving parts of the air brake mechanism only and resistant to the hand power mechanism only and acting in conjunction with the usual air brake spring for returning the brake system to normal inoperative position upon operation of either hand power mechanism or the air power mechanism.

6. Brake release mechanism for railway cars comprising an air cylinder having the usual piston, piston sleeve and push rod within the sleeve, a spring within the sleeve compressible upon withdrawal of the push rod from the sleeve for returning the said rod to normal position.

7. Brake release means for railway cars comprising an air cylinder having the usual piston, piston sleeve and push rod within the sleeve, a spring seat fixed to the inner end of the push rod, a spring cap secured to the outer end of the sleeve, a spring interposed between the spring seat and spring cap and compressible on withdrawal of the push rod from the sleeve.

8. Brake release mechanism for railway cars comprising the usual air cylinder provided with a push rod, a cylinder lever to which the push rod is connected, hand brake mechanism also connected to said cylinder lever, a spring bearing against the push rod and placed under strain by the operation of the hand brake mechanism only.

JOHN O. NEIKIRK.
DAVID HINDAHL.

CERTIFICATE OF CORRECTION.

Patent No. 1,736,048. Granted November 19, 1929, to

JOHN O. NEIKIRK ET AL.

It is hereby certified that error appears in the printed specification of the above numbered patent requiring correction as follows: Page 2, line 81, claim 1, for the word "downwardly" read "outwardly"; and that the said Letters Patent should be read with this correction therein that the same may conform to the record of the case in the Patent Office.

Signed and sealed this 17th day of December, A. D. 1929.

(Seal)

M. J. Moore,
Acting Commissioner of Patents.